United States Patent [19]

Ownby

[11] 4,054,627
[45] Oct. 18, 1977

[54] DENSE CHROMIUM SESQUIOXIDE

[76] Inventor: Paul Darrell Ownby, 1 Woodland Drive, Rolla, Mo. 65401

[21] Appl. No.: 359,661

[22] Filed: May 14, 1973

[51] Int. Cl.$^2$ .................. F27B 9/04; C04B 35/12
[52] U.S. Cl. .......................... 264/65; 106/66; 264/DIG. 57; 423/607
[58] Field of Search .............. 423/266, 607; 264/65, 264/66, DIG. 57; 106/66

[56] References Cited

U.S. PATENT DOCUMENTS

| 2,714,054 | 7/1965 | Voltz | 423/607 |
| 3,117,093 | 1/1964 | Arthur et al. | 423/607 |
| 3,451,771 | 6/1969 | Cox et al. | 423/607 |
| 3,600,484 | 8/1971 | Smoke et al. | 264/65 |

OTHER PUBLICATIONS

Lovell, "The Firing Expansions of Certain Chrome—Magnesia Products", *Trans. Brit. Cer. Soc.*, pp. 369–383, (1952).
Campbell et al., *High Temperature Material and Technology*, p. 278, (1967).
Lovell, "The Firing Expansions of Certain Chrome—Magnesite Products", *Transactions of the British Ceramic Society*, 1952.
Ownby et al., "Final Sintering of $Cr_2O_3$," *J. Am. Cer. Soc.* 55, [9] pp. 433–436.
Jungquist, "Final Sintering of $Cr_2O_3$ with Minor Additions of MgO and Sintering of MgO with Minor Additions of $Cr_2O_3$", M.S. Thesis, U. Missouri, 1971.

*Primary Examiner*—Robert F. White
*Assistant Examiner*—John Parrish
*Attorney, Agent, or Firm*—Wood, Herron & Evans

[57] ABSTRACT

A sintered, fine grained, polycrystalline, essentially fully dense, essentially single phase $Cr_2O_3$ body is prepared by sintering Chromium Sesquioxide ($Cr_2O_3$) at essentially the equilibrium oxygen partial pressure ($P_{O_2}$) for the formation of $Cr_2O_3$ from its elements at the sintering temperature. To achieve optimum theoretical density a second metal oxide dopant such as MgO, capable of controlling the grain size, is added.

In addition, $Cr_2O_3$ bodies are rendered more stable, and thus have a longer life, by maintaining over the body an atmosphere which is essentially equilibrium $P_{O_2}$ for the formation of $Cr_2O_3$ from its elements at that temperature.

2 Claims, 4 Drawing Figures

THE PERCENT WEIGHT LOSS OF CHROMIUM SESQUIOXIDE AS A FUNCTION OF OXYGEN PARTIAL PRESSURE AT 1600°C FOR 1 HR.

THE PERCENT OF THEORETICAL DENSITY AS A FUNCTION OF OXYGEN PARTIAL PRESSURE OF CHROMIUM SESQUIOXIDE SINTERED AT 1600°C FOR ONE HOUR USING $CO_2/CO$ BUFFER SYSTEM TO CONTROL THE OXYGEN PRESSURE.

Figure 3:
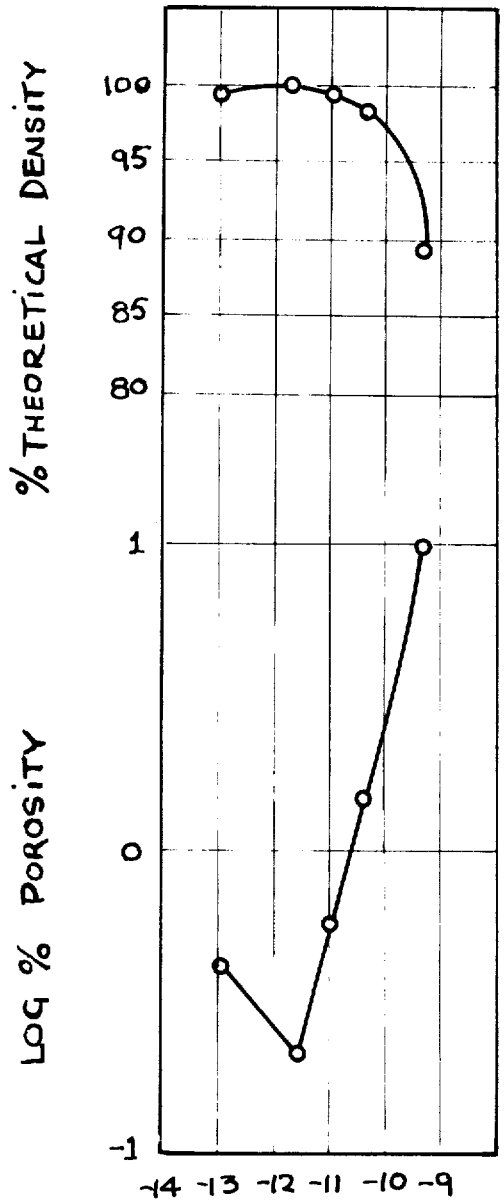
Figure 4:
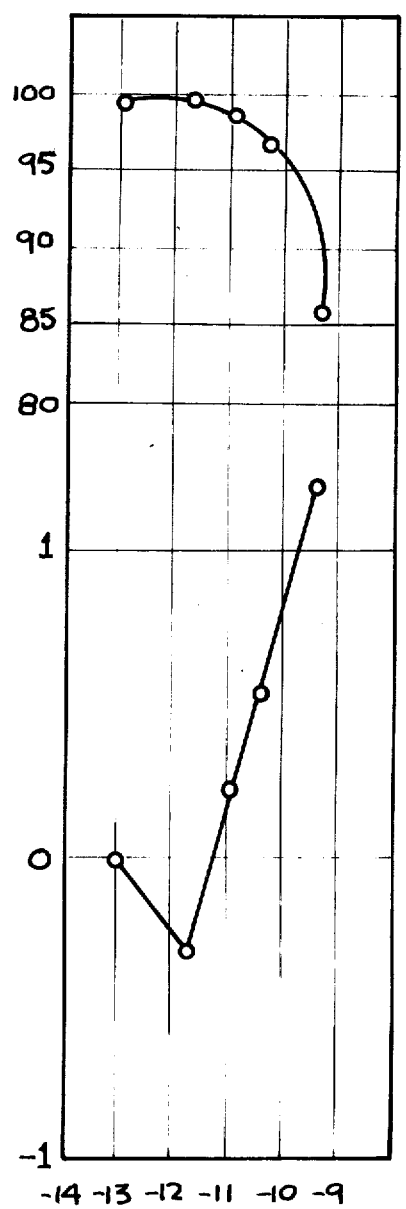

$P_{O_2}$ vs density and porosity of (FIG. 3.) $Cr_2O_3$ + 0.1 wt % MgO and (FIG. 4.) $Cr_2O_3$ + 1.0 wt % MgO, both sintered at 1600° C. for 1 hour.

DENSE CHROMIUM SESQUIOXIDE

Chromium sesquioxide ($Cr_2O_3$) is a potentially attractive refractory material having a melting point in excess of 2200° C. However, chromium has many oxidation states and readily changes at elevated temperatures from one to the other depending on the environment. In an oxidizing atmosphere the sesquioxide has a strong tendency to react with oxygen to form more volatile oxides such as $CrO_3$ whose rapid vaporization prevents sintering of the powders to high density. In a reducing atmosphere it is known to reduce to metallic chromium. In a powder or highly porous form these reactions readily occur because of the large surface area exposed to the environment. The high porosity of chromium oxide and chromium oxide-containing bodies has limited their usefulness because the ever-present and ever-increasing high surface area of these materials makes them more reactive to both gaseous and condensed phase environments. The inability to control the oxidation state of the chromium ion both during fabrication and use of chromium oxide ceramics constitutes a significant drawback to their use.

A second drawback is related to control of the grain size of the fired or sintered body. Several factors contribute to the desirability of grain size control. A few of the more important considerations are as follows:

1. Abnormal or excessively large grains reduce the mechanical strength of the body by introducing excessive local stresses and cracks.
2. These cracks act as pores reducing the density and in the case of some oxides the electromagnetic transmittance of the ceramic body because of their scattering capacity.
3. Rapid grain growth leading to discontinuous or abnormal grain growth leaves internal pores isolated in the large grains preventing final densification.
4. Without preventing the formation of volatile gaseous species with the resulting rapid loss of material, grain size control by means of grain growth inhibitors is useless and ineffective.

Thus, $Cr_2O_3$ has two drawbacks. On sintering it tends to:

1. Change oxidation state and volatilize away.
2. Undergo discontinuous grain growth.

Because of oxidation or reduction and discontinuous grain growth, sintered $Cr_2O_3$ has less than the theoretical density, reduced mechanical strength and is more subject to chemical attack from the environment because more surface area is exposed.

I have now discovered a method for producing sintered $Cr_2O_3$ of enhanced mechanical strength and essentially theoretical density which comprises preventing oxidation state changes and discontinuous grain growth of $Cr_2O_3$ during sintering.

Two main, important features of the method of producing high density chromium oxide ceramics of this invention include:

1. The oxidation state of the chromium ion is controlled by maintaining the equilibrium partial pressure of oxygen over the body during sintering so as to stabilize the sesquioxide.
2. The grain growth rate is controlled by adding a small but effective amount of a second metal oxide dopant, such as MgO, intimately mixed in the high purity powder compact. During sintering the dopant migrates to the grain boundaries controlling the grain growth rate and thereby allowing the intergranular pores to be eliminated and hence final or theoretical densification to occur.

The high, essentially theoretically dense $Cr_2O_3$ of this invention opens up many new uses for chromium oxide in addition to improving its present use such as in basic refractories. This stems from the fact that dense $Cr_2O_3$ is a unique ceramic material previously unavailable by sintering. The absence of grain boundary cracks and porosity eliminates the large internal surface area exposed to the environment in previous chromium oxide containing ceramics and therefore greatly reduces deterioration from oxidizing and reducing atmospheres and other chemical reactions with the service environment. The high density and absence of internal surface and discontinuous grain growth also makes the body mechanically stronger. For example, the fine grained, dense, $Cr_2O_3$ refractory body of this invention can be used in the fiberglass industry as well as in other glass-melting applications.

In addition, I have discovered that $Cr_2O_3$-containing bodies can be rendered more stable, and thus of extended life, at elevated temperatures, such as at sintering temperatures, by preventing the oxidation state changes of chromium. This is achieved by maintaining during sintering the oxygen partial pressure ($P_{O_2}$) over the body at essentially the equilibrium partial pressure of oxygen at that temperature. The particular $P_{O_2}$ will vary with the particular sintering temperature. Thus, equilibrium $P_{O_2}$ is not only important in the fabrication of dense $Cr_2O_3$ but it also extends the life of $Cr_2O_3$ bodies. For example, by operation at equilibrium $P_{O_2}$, the life of $Cr_2O_3$ bodies such as $Cr_2O_3$-containing refractories can be extended. Stated another way, an equilibrium $P_{O_2}$ atmosphere over the $Cr_2O_3$ body, whether pure or impure, enhances the stability and life of the $Cr_2O_3$.

In summary, equilibrium oxygen partial pressure at sintering temperature is required to obtain a $Cr_2O_3$ density within about 1% of theoretical. To obtain maximum or optimum theoretic density, i.e. 99+ to 100%, a second metal oxide, such as magnesium oxide, capable of controlling grain size, is employed in conjunction with equilibrium oxygen partial pressure.

In addition, $Cr_2O_3$ bodies are rendered more stable and thus have a longer life, by maintaining the equilibrium oxygen partial pressure over the body during sintering and/or use. Stated another way, the use of equilibrium oxygen partial pressure is essential to this invention. The use of the dopant in conjunction with the equilibrium partial pressure optimizes density.

The following examples are presented for purposes of illustration and not of limitation.

EXAMPLES 99.99% $Cr_2O_3$ was employed in order to distinguish the effect of small amounts of second oxide dopants. Electron microscopy revealed that the particle size was < 1 $\mu$m. Reagent-grade $Mg(NO_3)_2$ was used as the source of MgO. For the doped samples, the nitrate was dissolved in water and mixed with the $Cr_2O_3$ in a blendor for 10 min. The mixture was stirred continuously with a magnetic stirrer while the water evaporated. The powders were then calcined at 600° C. for 2 h in air. All samples were pressed into discs $\approx$ 0.5 in. in diameter and 0.25 in. thick. The green density was 60 to 65% of the theoretical density of $Cr_2O_3$. The specimens were placed in high-purity $Al_2O_3$ boats and introduced slowly into an Mo-wound controlled-atmosphere tube furnace at 1600° C. for 1 h.

The $P_{O_2}$ was controlled using a $CO/CO_2$ buffer system. Because of the small amount of $CO_2$ required at low $P_{O_2}$, $N_2$ mixed with 5% $CO_2$ was used. The presence or absence of $N_2$ proved to be unimportant as the same results were obtained with or without $N_2$ if the $CO/CO_2$ ratios were equal. Success could also be obtained using the $H_2/H_2O$ buffer system or any other effective means of controlling the oxygen partial pressure. The gases were passed through a mixing chamber consisting of a glass tube filled with glass beads before they were admitted into the furnace. The total linear gas-flow rate through the furnace tube to maintain equilibrium with the sample was 1 cm/s.

Fractured surfaces of selected specimens were examined by scanning electron microscopy.

The results are presented in FIGS. 1, 2, 3 and 4.

Figure 1:
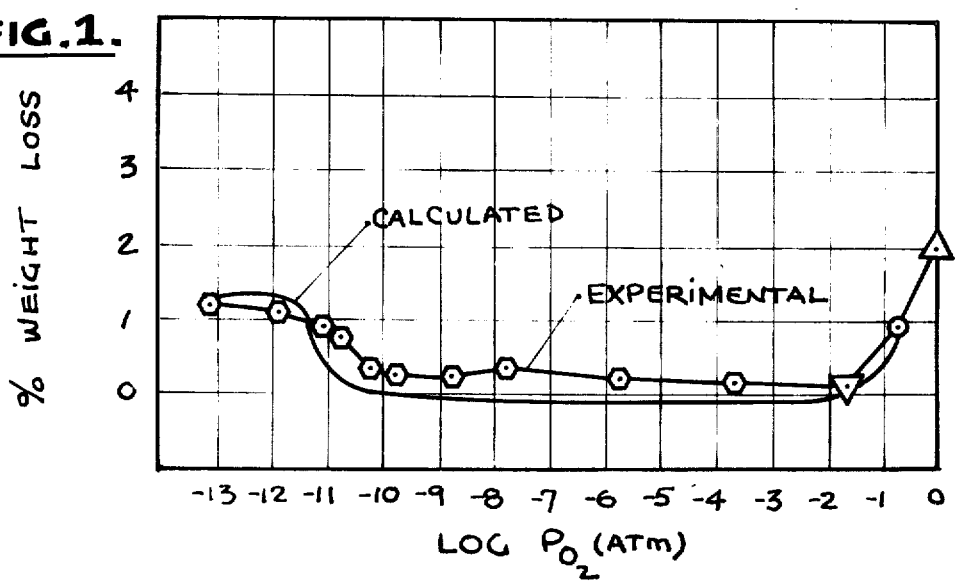
Figure 2:
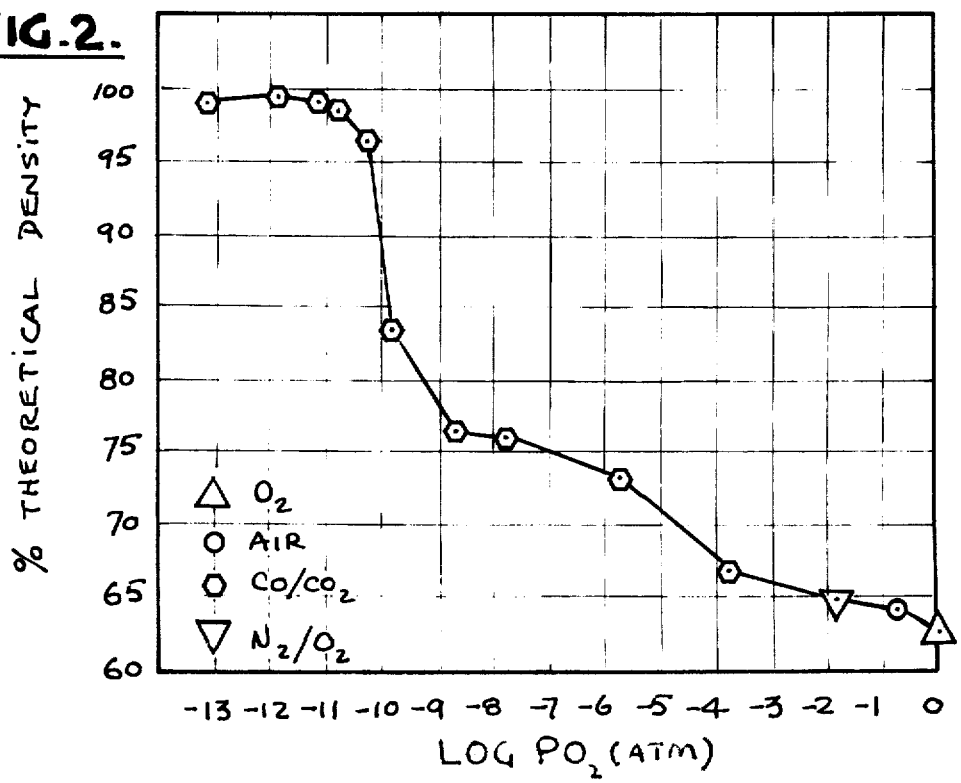

The density and the weight loss of $Cr_2O_3$ depend strongly on $P_{O_2}$ (FIGS. 1 and 2). The maximum density was obtained at the equilibrium $P_{O_2}$ ($2 \times 10^{-12}$ atm) for the reaction:

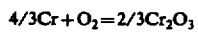

$$4/3Cr + O_2 = 2/3Cr_2O_3$$

at 1600° C. The density decreased at both higher $P_{O_2}$ (where $Cr_2O_3$ and other chromium oxides are stable) and lower $P_{O_2}$ (where Cr metal is stable). To ascertain the effect of the $N_2$ used in the buffer atmosphere to achieve $P_{O_2}$ accuracy at very low pressures, pressures down to $P_{O_2} = 10^{-11}$ atm were repeated using undiluted $CO_2$ and CO mixtures to achieve the desired $P_{O_2}$. The densities achieved by the two methods did not deviate significantly.

Scanning electron micrographs of fractured surfaces of the undoped sintered specimens showed the fine-grained, highly porous, partially sintered structure which resulted when the $P_{O_2}$ was too high, ($2 \times 10^{-10}$), the very dense, essentially void-free structure of $Cr_2O_3$ (99.4% of theoretical density) sintered at the equilibrium $P_{O_2}$ ($2 \times 10^{-12}$) and the intragranular pores at a lower $P_{O_2}$ ($9 \times 10^{-14}$).

The experimental weight-loss dependence of pure $Cr_2O_3$ on the $P_{O_2}$ is shown in FIG. 1. The general form of this dependence can be explained by considering the vapor-pressure dependence of the most volatile species on $P_{O_2}$. Using the vapor pressure and mass spectrometric data available for Cr, CrO, $CrO_2$, and $CrO_3$ at 1600° C. and the mass-action law, a theoretical weight-loss-vs-$P_{O_2}$ curve similar to the experimental one was obtained and is also shown in FIG. 1. The high weight loss at $P_{O_2} < 10^{-12}$ atm is associated with Cr-metal volatilization, whereas the high volatilization above $10^{-2}$ atm can be attributed to $CrO_3$. The level region between can be accounted for by the sum of the losses from these species plus that resulting from the volatilization of CrO and $CrO_2$.

The general density and weight loss dependence on $P_{O_2}$ is not limited to the high purity $Cr_2O_3$ used in this example but applies also to relatively impure $Cr_2O_3$ and $Cr_2O_3$-containing bodies. However, the enhancement of sintering by the addition of a small amount of a second oxide would not be expected to be seen in impure $Cr_2O_3$ where possibly many "second oxides" already exist.

The addition of MgO aided in the densification of the high purity $Cr_2O_3$. The porosity data for $Cr_2O_3$ with 0.1 wt% (0.37 mol%) and 1.0 wt% (3.7 mol%) MgO added as a function of $P_{O_2}$ are shown in FIGS. 3 and 4. The addition of only 0.1 wt% MgO enabled the $Cr_2O_3$ to sinter to nearly theoretical density (99.8%) at the equilibrium $P_{O_2}$. A fracture surface typical of $Cr_2O_3$ with 0.1 wt% MgO sintered at the equilibrium $P_{O_2}$, revealed a relatively uniform grain size. Fracture occurred mostly through the grains, whereas the pure $Cr_2O_3$ fractured mostly along grain boundaries. This appeared to be due to a locking together of the grains by second phase spinel nuclei which formed on the boundaries after the MgO segregated there. A lower density resulted when as much as 1.0 wt% MgO was added as shown in FIG. 4.

In summary, control of the $P_{O_2}$ near the equilibrium $P_{O_2}$ for the reaction $4/3Cr_{(c)} + O_{2(g)} = 2/3Cr_2O_{3(c)}$, at the sintering temperature is essential to the sintering of $Cr_2O_3$ to densities approaching theoretical. This equilibrium oxygen pressure is a function of temperature according to the relationship $P_{O_2} = \exp(\Delta G^*/RT)$ where $\Delta G^*$ is the standard free energy for the reaction shown at temperature and R is the gas content and T is the absolute temperature. The equilibrium $P_{O_2}$ can be maintained in any possible way. Two examples using the $CO/CO_2$ and the $H_2/H_2O$ buffer systems were cited but any method of maintaining the equilibrium oxygen pressure during sintering would suffice. The presence of $N_2$ in the sintering atmosphere does not appear to have a deleterious effect on the final sintering.

Addition of MgO produces a smaller, more uniform grain size compared to that of pure $Cr_2O_3$ sintered under the same conditions. The addition of only 0.1 wt% MgO to $Cr_2O_3$ increases the sintered density at $P_{O_2} = 2 \times 10^{-12}$ atm to essentially the theoretical value in 1 h. at 1600° C.

Sintering or firing is carried out at any temperature capable of producing the desired product such as above about 1100° C., for example from about 1100° C. to 2200° C., but preferably from about 1500° C. to 1800° C.

The dopant employed is any component which in minor amounts, such as below about 15%, for example below about 1% and preferably about 0.01 - 0.8%, with an optimum of about 0.1%, which is capable of controlling the grain growth of the sintered $Cr_2O_3$ so as to yield an essentially fully dense, essentially single phase $C_2O_3$ body. In practice a second oxide such as MgO or its equivalent is employed. A soluble salt can be used for optimum mixing which on sintering would yield the desired second oxide.

It has been shown that a small addition of a second oxide can be effective in enhancing sintering by a variety of mechanisms including the formation of a liquid phase, by controlling grain growth and/or by modifying the defect structure of the host material. Grain growth control by second oxide additions can in turn take place in a variety of ways including solute segregation at the grain boundaries, second phase precipitation on the grain boundaries, etc. However, none of these mechanisms can be effective unless the oxidation state is first controlled by first fixing the equilibrium oxygen pressure for the formation of the sesquioxide from its elements at the sintering temperature. A number of different choices of second oxides could then be added to control grain growth and achieve the additional ~1% of final densification needed to achieve theoretical density.

The product of this invention is a sintered, fine grained, polycrystalline, essentially fully dense, essentially single phase $Cr_2O_3$ body. Essentially theoretical density means that the final product has or approaches essentially the same density as a single crystal of $Cr_2O_3$.

Although this invention has been described primarily in relation to $Cr_2O_3$, the oxidation state control feature of it can also be applied to $Cr_2O_3$-containing bodies. Although the results have been maximized with $Cr_2O_3$ itself, improvements can be obtained with $Cr_2O_3$-containing bodies even though the presence of other components contained therein may prevent optimum improvement.

Likewise this invention has emphasized oxidation state control in fabrication of a dense chromium sesquioxide bodies, however this novel feature is also of value in extending the life of chromium sesquioxide refractories in use. By maintaining the oxygen partial pressure at the equilibrium pressure for the sesquioxide formation reaction at the use temperature, where possible, volatilization losses will be minimized.

The scope of this invention is meant to include the improvement in and maintenance of $Cr_2O_3$ and $Cr_2O_3$-containing bodies in accord with this invention which would not be obtainable without the teachings of this invention and the claims should be read in this spirit.

I claim:

1. A process for producing a sintered body consisting substantially of $Cr_2O_3$ up to within about 1% of theoretical density, which comprises, sintering a $Cr_2O_3$ body at essentially the equilibrium oxygen partial pressure for the formation of $Cr_2O_3$ from its elements at the sintering temperature.

2. The process of claim 1 where the body contains in intimate mixture therewith a small but effective amount of MgO as a dopant for controlling grain growth.

* * * * *